Aug. 24, 1965   JAMES E. WEBB   3,201,980
ADMINISTRATOR OF THE NATIONAL AERONAUTICS
AND SPACE ADMINISTRATION
THRUST DYNAMOMETER
Filed Feb. 15, 1963
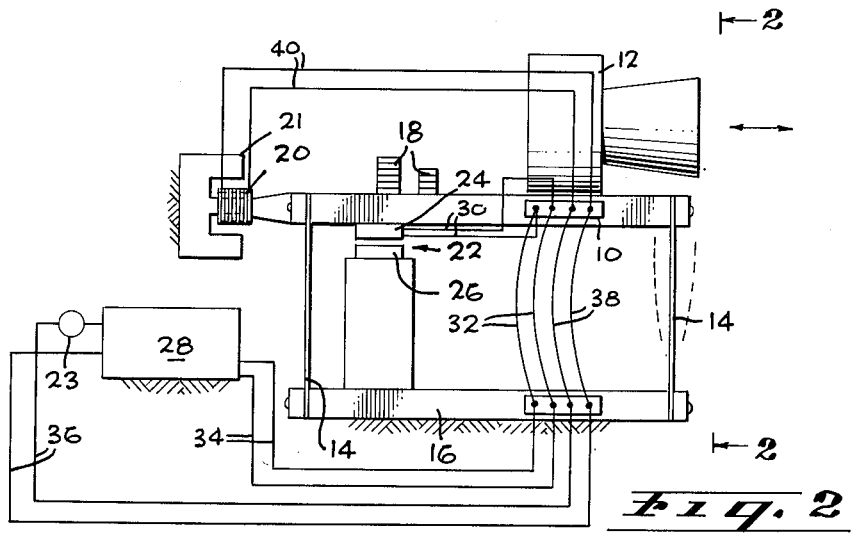
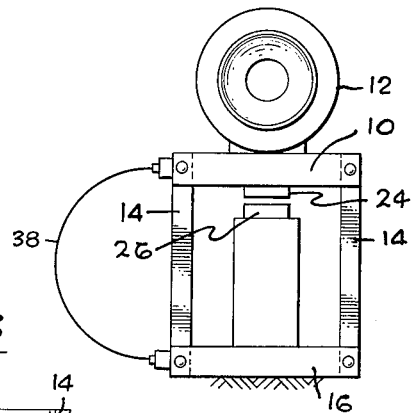
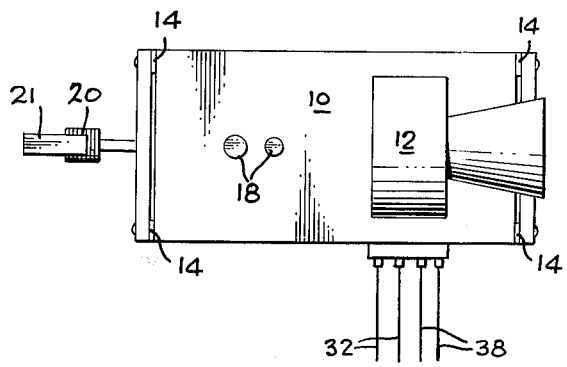
SIEGFRIED HANSEN
INVENTOR.
BY
ATTORNEYS

United States Patent Office 3,201,980
Patented Aug. 24, 1965

3,201,980
THRUST DYNAMOMETER
James E. Webb, Administrator of the National Aeronautics and Space Administration, with respect to an invention of Siegfried Hansen
Filed Feb. 15, 1963, Ser. No. 258,931
3 Claims. (Cl. 73—116)

The invention described herein may be manufactured and used by or for the Government of the United States of America for governmental purposes without the payment of any royalties thereon or therefor.

This invention relates to apparatus for accurately measuring thrust forces and more particularly the invention relates to apparatus for precisely measuring the thrust produced by an ion reaction engine.

The relatively recently developed means of obtaining propulsion for space ships by expelling a high momentum stream of ions and electrons from a combustion chamber is defined as ion propulsion. The scheme, presently, is intended for propulsion in gravitationless space where a microforce thrust might be operated over a long period of time to yield extremely high vehicular velocities. The processes for obtaining the stream of ions and electrons to produce an ion engine are molecular disassociation, nuclear fission, nuclear fusion and the like. Presently existing thrust measuring instruments are not capable of accurately determining the amount of microforce thrust being acquired by expelling ions and electrons from the combustion chamber.

Thus, it is an object of this invention to provide a thrust dynamometer which will accurately and precisely measure microforce thrust produced by an ion engine.

This and other objects of the invention will become more apparent from a consideration of the description which follows, taken in conjunction with the drawings.

FIG. 1 is a schematic, side elevational view embodying the present invention.

FIG. 2 is an end elevational view taken on line 2—2 of FIG. 1.

FIG. 3 is a plan view illustrating the present invention.

The invention embodies a substantially level, horizontally movable rectangular platform 10. Mounted preferrably on the upper surface of platform 10 is an ion engine 12 which develops very low thrust forces that are in the order of ten to one thousand micropounds, and it is this thrust which is to be measured. An alternative manner of mounting ion engine 12 is to suspend it from the lower surface of the platform.

Supporting platform 10 is a plurality of elongated leaf springs 14, there being a leaf spring fastened to each corner of the platform. Leaf springs 14 are in turn fastened to and supported by a flat stationary base 16 which is substantially parallel to platform 10. Initially the rigidity of leaf springs 14 is more than adequate to support platform 10 and ion engine 12.

To neutralize the rigidity of leaf springs 14, or to reduce the spring constant whereby it approaches zero or balance is achieved, a determinable quantity of weights 18 are placed on the upper surface of platform 10. The quantity of weights to be added is determined by the rigidity of springs 14. It might be supposed that the condition for reducing the aforementioned spring constant or to achieve balance requires a weight load that would be close to collapsing springs 14. Such is not the case, however, for it has been determined that for relatively any size of leaf spring the load for collapse is four times the load required to achieve balance.

The principle of the suspension or supporting of platform 10 is that of columnar instability. The moment due to bending of support springs 14 can be almost exactly compensated by the moment due to eccentric support of the weight of platform 10 and its load over quite an appreciable range of motion. Once condition for balance has been achieved, springs 14 tend to flex and assume either one of the configurations shown in dotted lines in FIG. 1. In this condition platform 10 tends to move horizontally under the influence of any added force which occurs such as that produced by the thrust of ion engine 12. It is necessary to provide for the measurement of this movement produced by the reaction thrust force which is accomplished by a servo feedback system which includes a movable coil permanent magnet 20 as a motor to develop a counterthrust equal and opposite to that of the engine. The movable coil 20 is preferably connected to and located at the left end of platform 10, as illustrated in FIG. 1, remote from the stream of ions and electrons discharged from the combustion chamber of ion engine 12.

The servo system also includes an electromagnetic sensor 22 which as represented in FIGS. 1 and 2 is divided into two portions, an upper portion 24 which is fastened to the underside of platform 10 and therefore movable with the platform, and a lower portion 26 which is mounted on and fastened to stationary base 16.

Movement of platform 10 either to the right or left, as viewed in FIG. 1, is detected by sensor 22 which relays a signal to movable coil 20 through a servo amplifier 28. Movable coil 20 unattached to but influenced by magnet 21 then produces the aforementioned counterthrust to counteract the movement of platform 10, and it is this counterthrust which is measured by a D.C. meter 23 so as to determine the thrust of engine 12. Instead of coil 20 being connected to platform 10 as aforementioned, magnet 21 may be connected to the platform. The results achieved would be substantially identical.

The movement of platform 10 is, as aforementioned, detected by sensor 22. The signal generated by sensor 22 is carried by conductors 30 to conductors 32 of a family of U-shaped loop conductors, each of which is insulated from the others and each of which bridges the distance between platform 10 and base 16. From loop conductors 32, the signal is delivered to amplifier 28 through conductors 34, and from amplifier 28 the signal is transmitted to meter 23. The amplified signal is transmitted from meter 23 via conductors 36 to conductors 38 of the loop conductors where the signal is transmitted to coil 20 through conductors 40.

Although the preceding method is the preferred manner of measuring thrust, it is to be understood that other means are available for achieving substantially the same results.

The manner of supporting engine 12 on platform 10 enables sensor 22 to easily detect the deflection of the platform produced by the thrust of the engine, and it has been determined that the sensor is capable of detecting a deflection of platform 10 created by ion engine thrust of about one micropound.

While the present invention has been described herein in what is considered to be a preferred embodiment thereof, it should be recognized that departures may be made therefrom within the scope of the invention, and it should therefore not be limited to the details of the aforementioned disclosure, but should be accorded the full scope of the appended claims.

What is claimed is:
1. A dynamometer for measuring the thrust of an ion propulsion system comprising:
   (a) a platform for supporting an ion engine;
   (b) means for adjusting the weight of said platform;
   (c) a base plate disposed adjacent to said platform in a spaced and parallel relationship with respect thereto;
   (d) a plurality of spring members connected between said platform and base plate, said spring members having a spring constant whose magnitude is such that by slight adjustment of the weight of said platform the spring constant can be made to approach zero, whereby, the platform is balanced and a very small thrust force applied thereto by an ion engine mounted thereon will result in deflection thereof with respect to said base plate;

(e) motor means attached to one end of said platform for applying a counterforce thereto which is equal and opposite to the force applied thereto by the ion engine;

(f) servo means for sensing the deflection of said platform means and actuating said motor means, and (g) means connected to the motor means for indicating the force exerted by said motor means.

2. A dynamometer for measuring the thrust of a reaction motor comprising:

(a) a platform on which the reaction motor is mounted;

(b) a base disposed below said platform;

(c) a plurality of leaf springs connected between said platform and said base for resiliently supporting said platform;

(d) means for adjusting the weight of said platform so as to preload said leaf springs to a point where their spring constant approaches zero, whereby said platform is balanced on said base and a very small thrust output from the reaction motor, in the range of 10 to 100 micropounds, will result in displacement thereof with respect to said base;

(e) sensor means attached to said platform and said base for detecting movement of said platform with respect to said base and generating an electric signal in response to such movement;

(f) motor means actuated by the electric signal from said sensor means for applying a counterforce to said platform that is equal and opposite to the force applied to said platform by the reaction motor, and (g) means electrically connected to the motor means for indicating the force exerted by said motor means and thereby also indicating the force exerted by said reaction motor since the forces are equal in magnitude.

3. The dynamometer recited in claim 2 wherein said motor means comprises:

(a) a coil connected to one end of said platform, and (b) a magnet disposed closely adjacent to said coil and extending into and around said coil.

References Cited by the Examiner

UNITED STATES PATENTS

| | | | |
|---|---|---|---|
| 2,210,970 | 8/40 | Bonell. | |
| 2,593,906 | 4/52 | Markson | 73—141 X |
| 2,790,322 | 4/57 | Grimes et al. | 73—116 |
| 2,849,669 | 8/58 | Kinkel | 73—141 X |

RICHARD C. QUEISSER, *Primary Examiner.*

DAVID SCHONBERG, *Examiner.*